United States Patent
Wong et al.

(10) Patent No.: US 10,423,197 B2
(45) Date of Patent: Sep. 24, 2019

(54) OBJECT SCANNERS WITH OPENINGS

(71) Applicant: HEWLETT-PACKARD DEVELOPMENT COMPANY, L.P., Houston, TX (US)

(72) Inventors: Glenn Wong, Sunnyvale, CA (US); Chris Harsacky, San Francisco, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/083,082

(22) PCT Filed: Feb. 8, 2017

(86) PCT No.: PCT/US2017/016995
§ 371 (c)(1),
(2) Date: Sep. 7, 2018

(87) PCT Pub. No.: WO2018/147844
PCT Pub. Date: Aug. 16, 2018

(65) Prior Publication Data
US 2019/0064889 A1    Feb. 28, 2019

(51) Int. Cl.
*G06F 1/16*    (2006.01)
*G01B 11/245*    (2006.01)
*H04M 1/725*    (2006.01)
*H04M 1/04*    (2006.01)

(52) U.S. Cl.
CPC .......... *G06F 1/1696* (2013.01); *G01B 11/245* (2013.01); *G06F 1/1654* (2013.01); *H04M 1/72527* (2013.01); *H04M 1/04* (2013.01)

(58) Field of Classification Search
CPC .............................. G06F 1/1626; G06F 1/1679
USPC ............................ 361/679.3, 679.55, 679.56
See application file for complete search history.

(56) References Cited

U.S. PATENT DOCUMENTS

| | | | | |
|---|---|---|---|---|
| 5,561,526 A | * | 10/1996 | Huber | G01B 11/2504 348/E13.005 |
| 6,844,869 B1 | * | 1/2005 | Kukita | G06F 1/1616 345/157 |
| 7,051,943 B2 | * | 5/2006 | Leone | G06K 7/10 235/383 |
| 7,841,533 B2 | * | 11/2010 | Kotlarsky | G06K 7/10722 235/462.01 |

(Continued)

FOREIGN PATENT DOCUMENTS

WO    2016039955 A1    3/2016

OTHER PUBLICATIONS

"Androscan", Retrieved from Internet—https://www.youtube.com/watch?v=nKBZOnhWiKU, 2015, 2 pages.

(Continued)

*Primary Examiner* — Anthony Q Edwards
(74) *Attorney, Agent, or Firm* — HP Inc. Patent Department

(57) ABSTRACT

An example object scanning system includes an object scanner having a backside. The backside includes a plurality of openings. The object scanning system also includes a handle attached to the backside via the plurality of openings. The object scanning system further includes a mount attached to the backside of the handle. The object scanner and the mount are attached to opposite sides of the handle.

14 Claims, 3 Drawing Sheets

(56) References Cited

U.S. PATENT DOCUMENTS

| | | | |
|---|---|---|---|
| 9,107,613 B2* | 8/2015 | Firth | G01B 11/25 |
| 9,693,040 B2* | 6/2017 | Hillebrand | H04N 13/246 |
| 10,008,028 B2* | 6/2018 | Zuccarino | G06T 15/205 |
| 10,070,107 B2* | 9/2018 | Suzuki | H04N 5/2251 |
| 10,191,514 B2* | 1/2019 | Bidwell | G06F 1/1632 |
| 2002/0099894 A1 | 7/2002 | Kehoe et al. | |
| 2010/0117885 A1* | 5/2010 | Holbrook | H04N 1/107 |
| | | | 342/22 |
| 2010/0134598 A1 | 6/2010 | St-Pierre et al. | |
| 2011/0134225 A1 | 6/2011 | Saint-Pierre et al. | |
| 2011/0201428 A1* | 8/2011 | Ferguson | A61B 5/1124 |
| | | | 463/37 |
| 2013/0057652 A1* | 3/2013 | Firth | G01B 11/25 |
| | | | 348/46 |
| 2014/0152769 A1* | 6/2014 | Atwell | H04N 13/207 |
| | | | 348/46 |
| 2014/0249942 A1 | 9/2014 | Hicks et al. | |
| 2015/0009672 A1 | 1/2015 | Girault | |
| 2015/0126244 A1 | 5/2015 | Moran et al. | |
| 2015/0130906 A1* | 5/2015 | Bridges | G01B 21/047 |
| | | | 348/46 |
| 2016/0006951 A1* | 1/2016 | Moghadam | G03B 35/02 |
| | | | 348/164 |
| 2016/0047914 A1* | 2/2016 | Zweigle | G09B 29/004 |
| | | | 356/5.01 |
| 2016/0069670 A1* | 3/2016 | Ruhland | G01B 11/2545 |
| | | | 356/610 |
| 2019/0022871 A1* | 1/2019 | Liu | B25J 13/088 |

OTHER PUBLICATIONS

"DJI Osmo Plus Camera", Uncrate, Retrieved from Internet—https://uncrate.com/dji-osmo-plus-camera/, 2016, 3 Pages.

"Saveo Scan—Scanning with Simplicity", Retrieved from Internet—https://saveoscan.com/wp-content/uploads/manuals/Saveo-Scan-M22D-BH-Manual.pdf, 20 Pages.

"Structure Sensor", Capture the World in 3D, Retrieved from Internet—https://www.kickstarter.com/projects/occipital/structure-sensor-capture-the-world-in-3d, 2016, 21 Pages.

* cited by examiner

OBJECT SCANNERS WITH OPENINGS

BACKGROUND

A 3D scanner can scan a real world object and generate a 3D model as a result of the scanning. The 3D model can be used in many industrial applications, such as prototyping, video game production, etc.

BRIEF DESCRIPTION OF THE DRAWINGS

Some examples of the present application are described with respect to the following figures.

DETAILED DESCRIPTION

Figure 1:
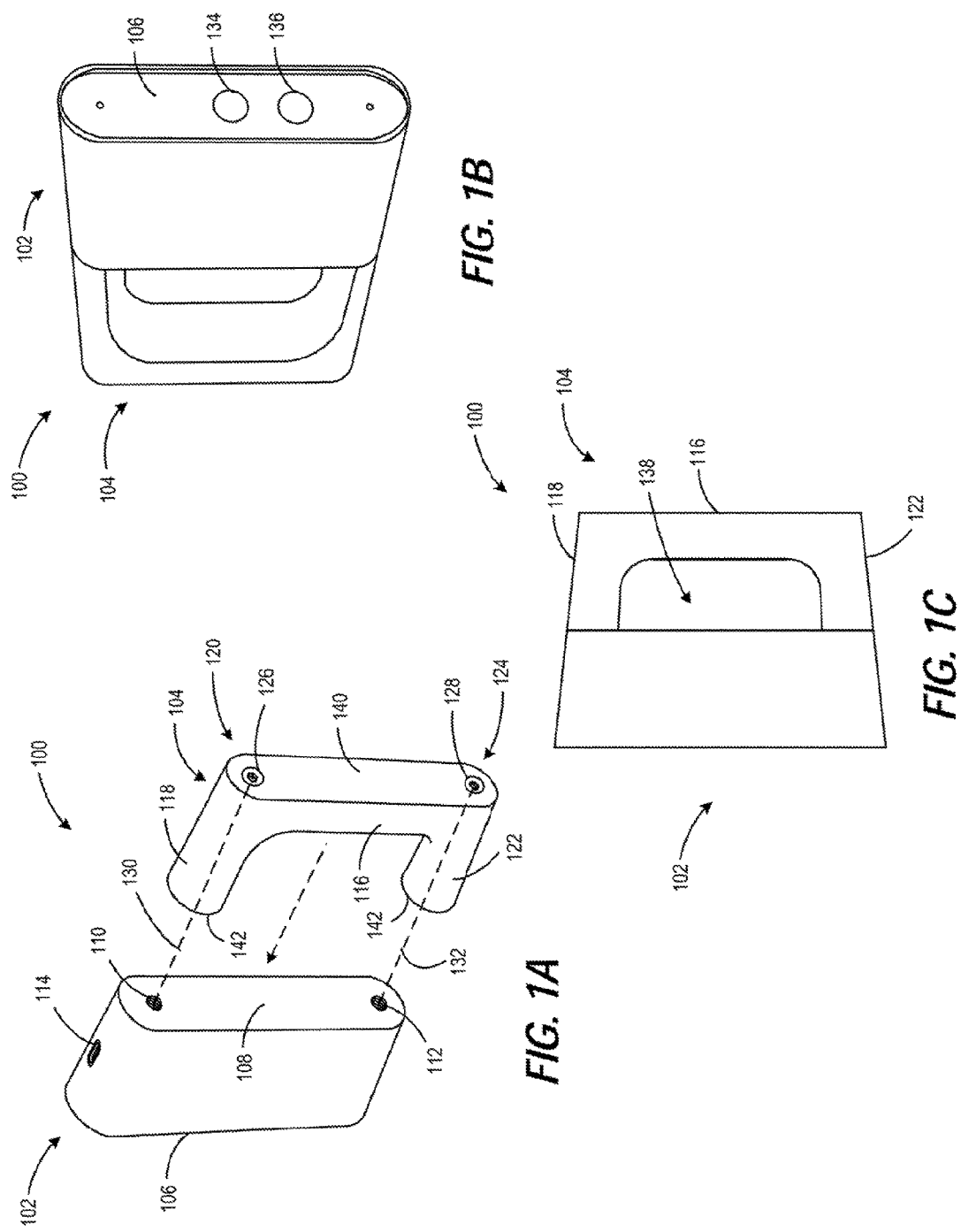
FIG. 1A illustrates a perspective view of a 3D scanning system having a scanner and a handle, according to an example.
FIG. 1B illustrates another perspective view of a 3D scanning system having a scanner and a handle, according to an example.
FIG. 1C illustrates a side view of a 3D scanning system having a scanner and a handle, according to an example.

One type of a three-dimensional (3D) scanner a portable 3D scanner. A portable 3D scanner may have relatively small physical dimensions so that a user may perform the 3D scanning by holding and moving the 3D scanner around the object of interest. However, a portable 3D scanner may be fixed into a single form-factor (e.g., being manufactured as a single integrated device) Thus, the ease of use of a portable 3D scanner may be reduced.

Examples described herein provide a 3D scanning system where different peripherals can be attached or removed from a scanner of the 3D scanning system. For example, a three-dimensional (3D) scanning system may include a scanner having a backside. The backside may include a plurality of openings. The 3D scanning system may also include a handle attached to the backside via the plurality of openings. The 3D scanning system may further include a mount attached to a backside of the handle. The object scanner and the mount may be attached to opposite sides of the handle.

As another example, a three-dimensional (3D) scanning system may include a scanner having a backside. The backside may include a first opening and a second opening. The 3D scanning system may also include a first mount attached to the scanner via the first opening. The 3D scanning system may further include a second mount attached to the scanner via the second opening.

As another example, a three-dimensional (3D) scanning system may include a scanner having a backside. The backside may include a first opening and a second opening. The 3D scanning system may also include a first mount attached to the scanner via the first opening. The 3D scanning system may further include a second mount attached to the scanner via the second opening. The first mount and the second mount may be independently rotatable with respect to the scanner. In this manner, examples described herein may increase the ease of use of a 3D scanner.

FIG. 1A illustrates a perspective view of a 3D scanning system 100 having a scanner and a handle, according to an example. 3D scanning system 100 may include a scanner 102 and a handle 104. Scanner 102 may perform 3D scanning via different techniques. For example, scanner 102 may perform 3D scanning via structured light. As another example, scanner 102 may perform 3D scanning via, modulated light. As another example, scanner 102 may perform 3D scanning via laser.

Scanner 102 may include a front side 106 and a backside 108. Front side 106 may be opposite to backside 108. Scanner 102 may perform 3D scanning via front side 106. Backside 108 may include a plurality of openings to receive peripheral(s) of scanner 102. For example, backside 108 may include a first opening 110 and a second opening 112. First opening 110 and second opening 112 may be located at opposite ends of backside 108. In some examples, openings 110 and 112 may be threaded so that a peripheral of scanner 102 may be attached to scanner 102.

In some examples, scanner 102 may include a data connector 114, such as universal serial bus (USB) connector. Data connector 114 may enable scanner 102 to connect to an external device to export data related to a scanning operation. In some examples, data connector 114 may enable scanner 102 to connect to an external display device so that a 3D model generated via a scanning operation may be displayed. Also, setting(s) of scanner 102 may also be displayed via the external display.

Handle 104 may include a body region 116, a first arm 118 extending from a first end 120 of body region 116, and a second arm 122 extending from a second end 124 of body region 116 opposite to the first end. Handle 104 may be attached to scanner 102 via openings 110 and 112. For example, first arm 118 may include a fastener (not shown in FIGS) to mate with opening 110 and second arm 122 may include a fastener (not shown in FIGS) to mate with, opening 112. The fasteners may be located on a front side 142 of handle 104 that is opposite to backside 140. When handle 104 is attached to scanner 102, a user of scanner 102 may hold body region 116 of handle 104 to move scanner 102 in different orientations.

In some examples, handle 104 may include a plurality of openings to receive additional peripheral(s) of scanner 102. For example, handle 104 may include a third opening 126 and a fourth opening 128 located on a backside 140 of handle 104. When attached to scanner 102, third opening 126 may be aligned with first opening 110 along a first axis 130. Also, fourth opening 128 may be aligned with second opening 112 along a second axis 132 parallel with first axis 130. Attaching additional peripheral(s) to handle 104 is described in more detail in FIG. 2.

FIG. 1B illustrates another perspective view of 3D scanning system 100 having a scanner and a handle, according to an example. Scanner 102 may include a light source 134 that projects light onto an object to perform 3D scanning. Scanner 102 may also include a camera 136 to detect the reflection from the projected light in order to generate a 3D model of the scanned object. Light source 134 and camera 136 may be exposed via front side 106 of scanner 102.

FIG. 1C illustrates a side view of 3D scanning system 100 having a scanner and a handle, according to an example. As illustrated in FIG. 1C, handle 104 may have a U-shaped profile as defined by body region 116, first arm 118, and second arm 122. When attached to scanner 102, the U-shaped profile may define space 138. Space 138 may enable a user of scanner 102 to grab body region 116 of handle 104 in order to manipulate an orientation of scanner 102.

Figure 2:
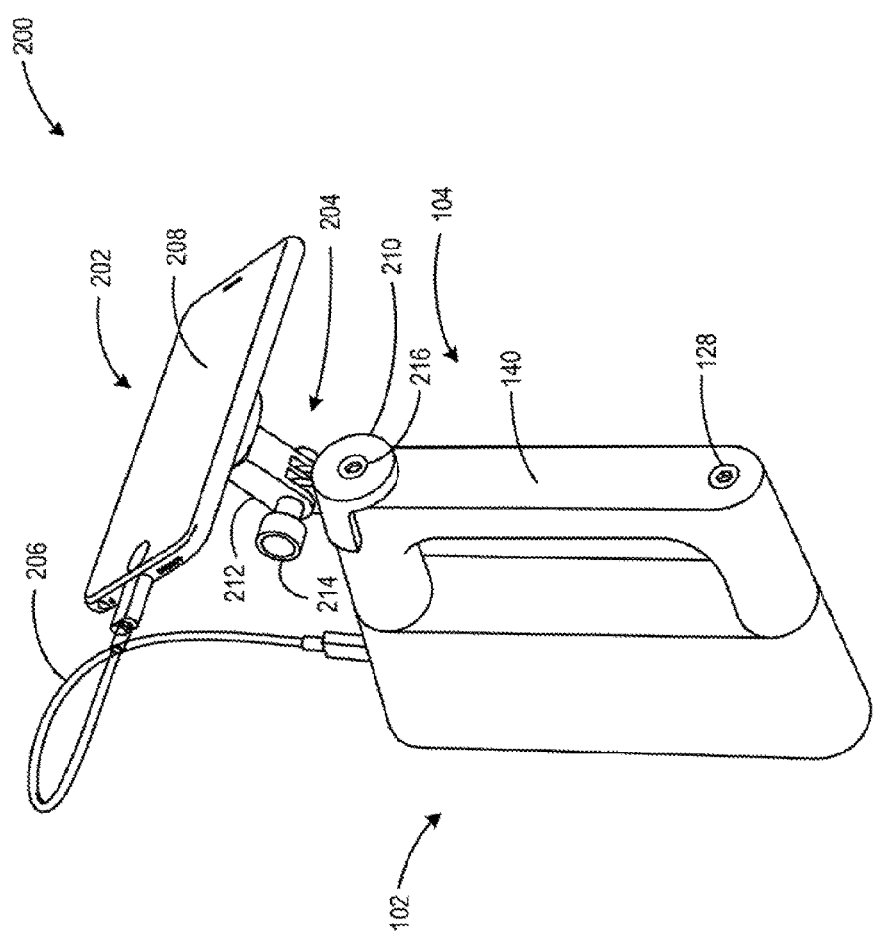
FIG. 2 illustrates a perspective view of a 3D scanning system having a scanner, a handle, and a mount attached to the handle, according to an example.

FIG. 2 illustrates a perspective view of a 3D scanning system 200 having a scanner, a handle, and a mount attached to the handle, according to an example. 3D scanning system 200 may include scanner 102 of FIG. 1, handle 104 of FIG. 1, and a mount 204.

A mobile device 202 may be electrically connected to scanner 102 via a cable 206. Cable 206 may be plugged into a data connector (not shown in FIGS) of mobile device 202 and data connector 114 (not shown in FIG. 2) of scanner 102. Thus, scanner 102 may communicate with or provide power to mobile device 202.

Mobile device 202 may be any portable electronic device that it dudes a display. For example, mobile device 202 may be a mobile phone. As another example, mobile device 202 may be a liquid crystal display (LCD). Mobile device 202 may include a display 208. In some examples, mobile device 202 may serve as a display of scanner 102. Thus, data associated with scanner 1 02 may be displayed on display 208. The data may include setting(s) of scanner 102, 3D model of an object scanned by scanner 102, etc.

Mobile device 202 may be attached to backside 140 of handle 104 via mount 204. Mount 204 may include a first member 210, a second member 212, and an adjustment screw 214 that connects members 210 and 212 together. First member 210 may include an opening 216 that is aligned with third opening 126 (not shown in FIG. 2) so that a fastener (not shown in FIG. 2) may attach first member 210 to handle 104 via third opening 126. Second member 212 may be attached to mobile device 202 via different techniques, such as adhesive, suction, mechanical attachment, etc.

Mount 204 may rotate with respect to scanner 102 to control an angle at which display 208 of mobile device 202 may be viewed by a user. For example, when first member 210 is fixedly attached to handle 104, a user rotate second member 212 with respect to first member 210. Alternatively, the user may hold onto mobile device 202 and/or second member 212. The user may then rotate handle 104, scanner 102, first member 210, or a combination thereof with respect to mobile device 202.

Adjustment screw 214 may be used to adjust an amount of rotation with respect to scanner 102. Adjustment screw 214 may determine an amount of pressure applied against intersecting regions of first member 210 and second member 212. When adjustment screw 214 is turned in a direction (e.g., clockwise), the amount of pressure applied may be increased. When the amount of pressure applied is greater than a threshold, first member 210 and second member 212 may not rotate relative to each other. When adjustment screw 214 is turned in an opposite direction (e.g., counterclockwise), the amount of pressure applied may be reduced. When the amount of pressure applied is less than the threshold, the first member 210 and second member 212 may rotate relative to each other. In some examples, instead of adjustment screw 214, other device(s) may be used to adjust the amount of rotation with respect to scanner 102. For example, a ball bearing may be used. As another example, mechanical gear(s) may be used.

As illustrated in FIG. 2, mount 204 may be attached to backside 140 of handle 104 and scanner 102 may be attached to front side 142 (not shown in FIG. 2) of handle 104. By attaching mount 204 and scanner 102 to opposite sides of handle 104, the ease of use of scanning system 100 may be increased as a user does not have to remove handle 104 from scanner 102 in order to attach mobile device 202 to scanner 102. Although FIG. 2 illustrates a mobile device 202 attached to handle 104, it should be understood that other peripheral(s) may be attached to handle 104 via third opening 126 (not shown in FIG. 2) and/or fourth opening 128.

Figure 3:
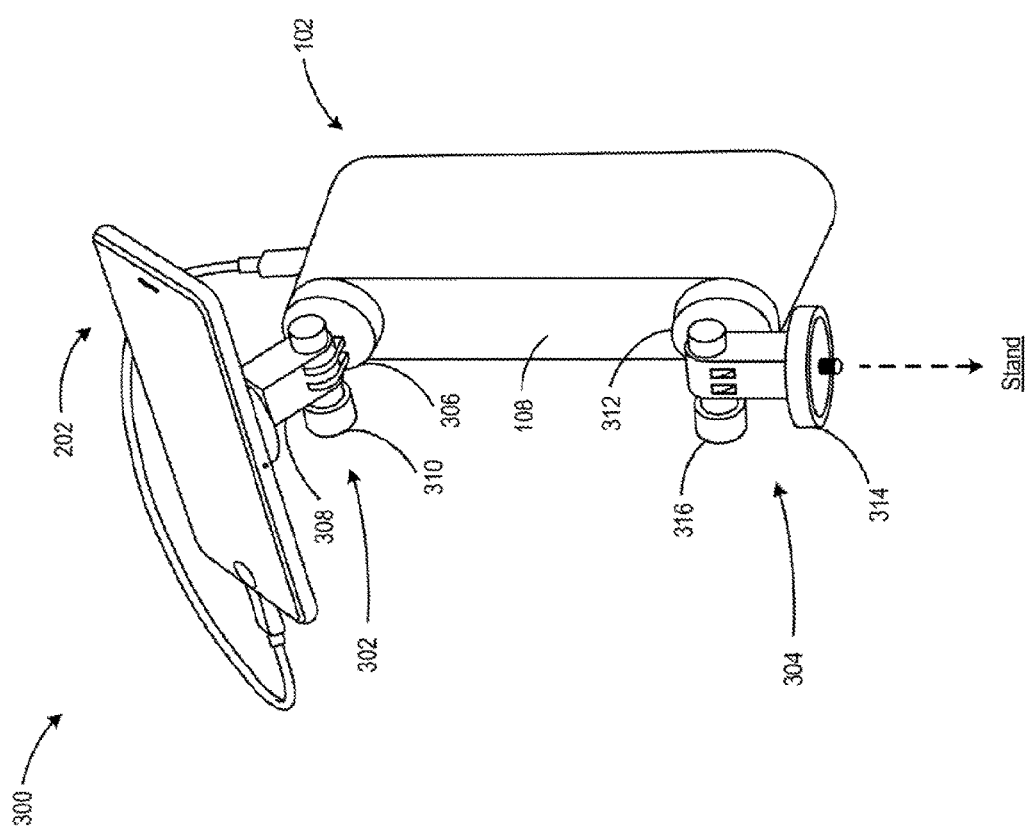
FIG. 3 illustrates a perspective view of a 3D scanning system having a scanner, a first mount attached to the scanner, and a second mount attached to the scanner, according to an example.

FIG. 3 illustrates a perspective view of a 3D scanning system 300 having a scanner, a first mount attached to the scanner, and a second mount attached to the scanner, according to an example. 3D scanning system 300 may include scanner 102, a first mount 302, and a second mount 304. Unlike 3D scanning system 200 of FIG. 2, 3D scanning system 300 may not include a handle, such as handle 104.

Each of first mount 302 and second mount 304 may enable different peripheral(s) to be attached to scanner 102. For example, mobile device 202 may be attached to first mount 302. Mobile device 202 may communicate with scanner 102 as described in FIG. 2.

First mount 302 may include a first member 306, a second member 308, and an adjustment screw 310. First mount 302 may operate in a similar manner as first mount 204 of FIG. 2. First member 306 may be attached to backside 108 of scanner 102 via first opening 110 (not shown in FIG. 3). Second member 308 may be attached to mobile device 202.

Second mount 304 may include a first member 312, a second member 314, and an adjustment screw 316. Second mount 304 may operate similar to first mount 302. First member 312 may be attached to second opening 112 (not shown in FIG. 3) of scanner 102. Second member 314 may be attached to a standing, such as a tripod.

First mount 302 and second mount 304 may be independently rotatable with respect to scanner 102. That is, rotations of first mount 302 with respect to scanner 102 does not impact rotations of second mount 304 with respect to scanner 102, or vice versa. The independent rotations of first mount 302 and second mount 304 may offer two degrees of freedom of movement. For example, when mobile device 202 and a stand are attached to scanner 102 via first mount 302 and second mount 304, respectively, a user may first rotate the scanner 102 with respect to the stand via second mount 304 to aim scanner 102 towards an object to be scanned. The user may then rotate mobile device 202 with respect to scanner 102 to set up a viewing angle for mobile device 202.

The use of "comprising", "including" or "having" are synonymous and variations thereof herein are meant to be inclusive or open-ended and do not exclude additional unrecited elements or method steps.

What is claimed is:

1. A three-dimensional (3D) scanning system comprising:
   a scanner having a camera, a light source, a front side and a backside, wherein the camera and the light source are exposed via the front side, and wherein the backside includes a plurality of openings;
   a handle attached to the backside via the plurality of openings; and
   a mount attached to a backside of the handle, wherein the scanner and the mount are attached to opposite sides of the handle.

2. The 3D scanning system of claim 1, wherein the handle includes:
   a body region;
   a first arm extending from a first end of the body region; and
   a second arm extending from a second end of the body region.

3. The 3D scanning system of claim 1, wherein the handle has a U-shaped profile.

4. The 3D scanning system of claim 1, wherein the scanner is a structured light scanner.

5. The 3D scanning system of claim 1, wherein the mount is to receive a mobile device serving as a display of the scanner.

6. A three-dimensional (3D) scanning system comprising:
   a scanner having a backside, wherein the backside includes a first opening and a second opening;
   a first mount attached to the scanner via the first opening, wherein the first mount is to be adjusted via an adjustment screw of the first mount; and
   a second mount attached to the scanner via the second opening, wherein the second mount is to be adjusted via an adjustment screw of the second mount, wherein the second mount is to attach the 3D scanning system to a stand.

7. The 3D scanning system of claim 6, wherein the first mount is rotatable with respect to the scanner.

8. The 3D scanning system of claim 6, wherein the second mount is rotatable with respect to the scanner.

9. A three-dimensional (3D) scanning system comprising:
   a scanner having a backside, wherein the backside includes a first opening and a second opening;
   a first mount attached to the scanner via the first opening; and
   a second mount attached to the scanner via the second opening, wherein the first mount and the second mount are independently rotatable with respect to the scanner.

10. The 3D scanning system of claim 9, where in the first mount includes an adjustment screw to adjust an amount of rotation with respect to the scanner.

11. The 3D scanning system of claim 9, where in the second mount includes an adjustment screw to adjust an amount of rotation with respect to the scanner.

12. The 3D scanning system to claim 9, wherein the second mount is to attach the 3D scanning system to a stand.

13. The 3D scanning system to claim 9, wherein the scanner is a structured light scanner.

14. The 3D scanning system to claim 9, wherein the first mount is to receive a mobile device to serve as a display of the scanner.

* * * * *

UNITED STATES PATENT AND TRADEMARK OFFICE
CERTIFICATE OF CORRECTION

PATENT NO. : 10,423,197 B2
APPLICATION NO. : 16/083082
DATED : September 24, 2019
INVENTOR(S) : Glenn Wong et al.

Page 1 of 1

It is certified that error appears in the above-identified patent and that said Letters Patent is hereby corrected as shown below:

In the Claims

In Column 6, Line 9, Claim 10, delete "where in" and insert -- wherein --, therefor.

In Column 6, Line 12, Claim 11, delete "where in" and insert -- wherein --, therefor.

In Column 6, Line 15, Claim 12, delete "system to" and insert -- system of --, therefor.

In Column 6, Line 17, Claim 13, delete "system to" and insert -- system of --, therefor.

In Column 6, Line 19, Claim 14, delete "system to" and insert -- system of --, therefor.

Signed and Sealed this
Thirty-first Day of December, 2019

Andrei Iancu
*Director of the United States Patent and Trademark Office*